(12) United States Patent
Stoeva et al.

(10) Patent No.: US 8,939,568 B2
(45) Date of Patent: Jan. 27, 2015

(54) INK COMPOSITION CONTAINING POLYURETHANE VINYL HYBRID LATEXES

(75) Inventors: Savka Ilieva Stoeva, San Diego, CA (US); Sergiy Peleshanko, San Diego, CA (US); Mark L. Choy, San Diego, CA (US); Gregg A. Lane, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 116 days.

(21) Appl. No.: 13/581,976

(22) PCT Filed: Apr. 14, 2010

(86) PCT No.: PCT/US2010/031012
§ 371 (c)(1),
(2), (4) Date: Aug. 30, 2012

(87) PCT Pub. No.: WO2011/129821
PCT Pub. Date: Oct. 20, 2011

(65) Prior Publication Data
US 2013/0021406 A1    Jan. 24, 2013

(51) Int. Cl.
*C09D 175/04* (2006.01)
*C08G 18/10* (2006.01)
*B41J 2/21* (2006.01)
(Continued)

(52) U.S. Cl.
CPC .............. *C08G 18/10* (2013.01); *C09D 175/04* (2013.01); *B41J 2/2107* (2013.01); *B41J 2/21* (2013.01); *C08G 18/0823* (2013.01); *C08G 18/12* (2013.01); *C08G 18/348* (2013.01); *C08G 18/4825* (2013.01); *C08G 18/5015* (2013.01);
(Continued)

(58) Field of Classification Search
CPC .............. B41J 2/01; B41J 2/21; B41J 2/2107; C09D 11/00; C09D 11/30; C09D 11/322; C09D 11/40; C09D 175/04; C08G 18/10
USPC .................... 347/95–100, 102; 523/160, 161; 106/31.13, 31.27, 31.6
See application file for complete search history.

(56) References Cited

U.S. PATENT DOCUMENTS 5,571,861 A * 11/1996 Klein et al. ................... 524/591
2003/0184629 A1  10/2003 Valentini et al.
(Continued)

FOREIGN PATENT DOCUMENTS

EP    1431321       6/2004
JP    05-025239     2/1993
(Continued)

OTHER PUBLICATIONS

International Search Report and Written Opinion for PCT/US2010/031012 dated 26 Jan. 2011 (8 pages).
(Continued)

*Primary Examiner* — Matthew Luu
*Assistant Examiner* — Rut Patel
(74) *Attorney, Agent, or Firm* — Hewlett-Packard Patent Department; Sandra Beccarelli

(57) ABSTRACT

Ink compositions and method of making the same are disclosed. A disclosed example ink composition includes a liquid vehicle, a colorant system and polyurethane vinyl hybrid latexes. Also disclosed is a method of using such ink composition containing polyurethane vinyl hybrid latexes.

19 Claims, 1 Drawing Sheet

(51) Int. Cl.

| | | |
|---|---|---|
| *C08G 18/08* | (2006.01) | |
| *C08G 18/12* | (2006.01) | |
| *C08G 18/34* | (2006.01) | |
| *C08G 18/48* | (2006.01) | |
| *C08G 18/50* | (2006.01) | |
| *C08G 18/61* | (2006.01) | |
| *C08G 18/75* | (2006.01) | |
| *C09D 11/324* | (2014.01) | |
| *C09D 11/40* | (2014.01) | |

(52) U.S. Cl.
CPC .............. *C08G 18/61* (2013.01); *C08G 18/755* (2013.01); *C09D 11/324* (2013.01); *C09D 11/40* (2013.01)
USPC ........................... 347/100; 347/95; 106/31.13

(56) References Cited

U.S. PATENT DOCUMENTS

| | | |
|---|---|---|
| 2005/0215663 A1 | 9/2005 | Berge et al. |
| 2008/0207811 A1 | 8/2008 | Brust et al. |
| 2008/0207820 A1 | 8/2008 | Brust et al. |
| 2008/0318009 A1 | 12/2008 | Berge et al. |
| 2009/0035535 A1 | 2/2009 | Wachi et al. |
| 2009/0163646 A1 | 6/2009 | Kato et al. |
| 2009/0169748 A1 | 7/2009 | House et al. |
| 2009/0259012 A1 | 10/2009 | Roberts |
| 2009/0264586 A1 | 10/2009 | Mestach et al. |
| 2009/0304925 A1 | 12/2009 | Berge et al. |
| 2012/0147108 A1* | 6/2012 | Ganapathiappan et al. .. 347/102 |

FOREIGN PATENT DOCUMENTS

| | | |
|---|---|---|
| JP | 11-279466 | 10/1999 |
| JP | 2002235023 | 8/2002 |
| JP | 2004175918 | 6/2004 |
| JP | 2007056268 | 3/2007 |
| WO | WO03/062331 | 7/2003 |
| WO | WO 2009/143418 A1 | 11/2009 |

OTHER PUBLICATIONS

European Search Report for PCT/US2010/031012 dated 8 Aug. 2013 (5 pages).

* cited by examiner

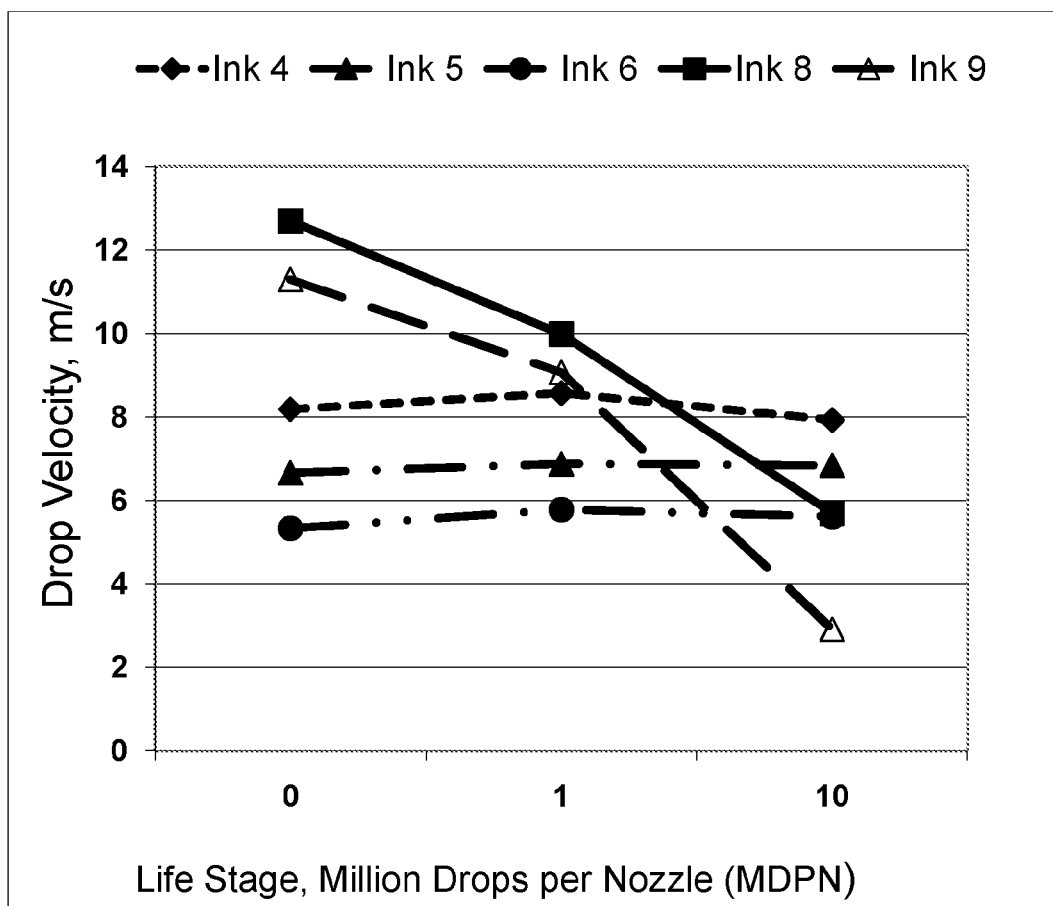

INK COMPOSITION CONTAINING POLYURETHANE VINYL HYBRID LATEXES

BACKGROUND

Inkjet technology has expanded its application to high-speed, commercial and industrial printing, in addition to home and office usage. This technology is a non-impact printing method in which an electronic signal controls and directs droplets or a stream of ink that can be deposited on a wide variety of substrates. Current inkjet printing involves forcing the ink drops through small nozzles by thermal ejection, piezoelectric pressure or oscillation, onto the surface of a media. There are several reasons that inkjet printing has become a popular way of recording images on various media surfaces, particularly paper. Some of these reasons include low printer noise, capability of high-speed recording, high quality and multi-color recording. Additionally, these advantages can be obtained at a relatively low price to consumers. However, though there has been great improvement in inkjet printing, accompanying this improvement are increased demands by consumers in this area, e.g., higher speeds, higher resolution, full color image formation, increased stability, more permanent images, etc.

With respect to inkjet ink chemistry, the majority of commercial inkjet inks are water-based. Thus, their constituents are often water-soluble (as in the case with many dyes) or water dispersible (as in the case with many pigments). Because of their water-based nature, inkjet ink systems often tend to exhibit poorer image fade and durability when exposed to water or high humidity compared to other photographic or printing methods. Various compounds and polymers have been incorporated in view of improving ink performances. However, such incorporation often results in creating poor printing quality and/or damages to the printhead containing such inks.

BRIEF DESCRIPTION OF THE DRAWING

In order to better understand the disclosure, some embodiments will be described below by way of non-limiting examples only, with reverence to figures, wherein FIG. 1 is a graph representing ink drop velocity, in relation with drops/nozzle, for different examples and comparative inks compositions.

DETAILED DESCRIPTION

Before particular embodiments of the present disclosure are disclosed and described, it is to be understood that the present disclosure is not limited to the particular process and materials disclosed herein as such and may vary to some degree. It is also to be understood that the terminology used herein is used for describing particular embodiments only and is not intended to be limiting, as the scope of the present disclosure will be defined by the claims and equivalents thereof. In describing and claiming the present exemplary composition and method, the following terminology will be used: the singular forms "a", "an", and "the" include plural referents unless the context clearly dictates otherwise.

Thus, for example, reference to "a pigment" includes reference to one or more of such materials. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc. Wt % means herein percentage by weight. All percents are by weight unless otherwise indicated.

The present disclosure relates to ink composition that contains a liquid vehicle, a colorant system and polyurethane vinyl hybrid latexes. In some examples, the ink composition is an inkjet ink composition. It is believed that that it is with this specific combination that the ink composition has specific properties: good durability performance while maintaining good jettability.

The ink composition when printed on media, results in images that present good ink durability, such as smear resistance, water fastness, rub and scratch resistance. By "scratch resistance", it is meant herein that the ink composition is resistant to all modes of scratching that include abrasion and burnishing. By "abrasion", it is meant herein the damage to a print due to wearing, grinding or rubbing away due to friction. Abrasion is correlated with removal of colorant (i.e. with OD loss). An extreme abrasive failure would remove so much colorant that the underlying white of the paper would be revealed.

In addition, the ink composition when printed on media using inkjet device, presents good reliability along time, i.e. the inkjet device maintains its jetting performances along time. Indeed, such ink composition does not deteriorate the health of the printhead and of the nozzle containing it. The term "jettability", as referred herein, means the ability of the ink to readily eject from the printhead, and to preserve the health of the printhead, i.e. do not create kogation problem and maintain thus the jetting capability of the ink. The kogation is a deposition phenomenon that tends to clog the nozzle of the printhead. Thus, the ink composition does not present any kogation effect and does not result in clogging the nozzle of the printing machine. In other words, the ink composition can be effectively used with inkjet printing devices and provides good image printing performances.

The ink composition is, thus, particularly well adapted for high-speed printing and high throughput digital printing. In addition, the ink composition of the present disclosure is well adapted to be printed on various types of media.

It is to be understood that all of the materials of the ink composition are present in effective amounts so that the combination achieves the above characteristics when printed. These features result in providing good image quality under inkjet printing process conditions.

As "polyurethane vinyl hybrid latex", it means herein an intimate blend of polyurethane polymer and of vinyl polymer. Such blends are present in the ink composition in the form of latex. Without being linked by any theories, it is believed that the polyurethane polymer acts as an emulsifying agent for the vinyl polymer. Such vinyl polymer is polymerized in-situ and is cross-linked in view of forming an interpenetrated network of the two polymers: vinyl and polyurethane polymers. Intimate blends of more than one polyurethane polymer and more than one vinyl polymer may also be utilized. In some embodiments, other components, such as polymerizable surfactants and/or free radical initiators and/or crosslinkers may also be present in the polyurethane vinyl hybrid latex.

In some examples, polymerizable surfactants are present in the polyurethane vinyl hybrid latex. Polymerizable surfactants may be added to the polyurethane polymer dispersion prior to the addition of vinyl polymers. These polymerizable surfactants are capable of dispersing vinyl polymers and include ethylenically unsaturated group. Such polymerizable surfactants are commercially available from different sources, for example, under the trade names Adeka Reasoap® (by Asahi Denka Co., Ltd), and Noigen and Hitenol series (Dai-Ichi Kogyo Seiyaku Co., Ltd). In some examples, the polymerizable surfactants are present in the range of about 0.01% to about 10% by weight, based on the weight of the polyurethane polymer, and in other examples, in the range of about 0.1% to about 5% by weight based on the weight of the polyurethane polymer.

Free radical initiators can be present in the polyurethane vinyl hybrid latex. Such free radical initiator may be an oil-soluble or water-soluble compound. Radical initiators include various types of initiators, such as persulfates, percarbonates, perborates, peroxides, azo compounds, and alkyl perketals. Non-limiting examples of free radical initiators include potassium persulfate, ammonium persulfate, sodium persulfate, benzoyl peroxide, hydrogen peroxide, di-t-butyl peroxide, dicumyl peroxide, cumene hydroperoxide, t-butyl hydroperoxide, t-butyl peroxy-acetate, 2,2'-azobis(2-amidinopropane)-dihydrochloride, azodiisobutyronitrile, 2,2'-azobis(N,N'-dimethyleneisobutyramidine), 2,2'-azobis(2-methylbutyronitrile), 4,4'-azobis(4-cyanopentanoic acid), 2,2'-azobis(2-methyl-N-[1,1-bis(hydroxymethyl)-2-hydroxyethyl]-propionamide), 2,2'-azobis[2-methyl-N-(2-hydroxyethyl)-propionamide], 2,2'-azobis (isobutyramide) dihydrate. Any combination of free radical initiators may be used. In some examples, the water-soluble initiator is potassium persulfate and the oil-soluble initiator is benzoyl peroxide. In other examples, the water-soluble initiator is 4,4'-azobis(4-cyanopentanoic acid) and the oil-soluble initiator is 2,2'-azobis(2-methylbutyronitrile). The initiators can be present in the range of about 0.01% to about 10% by weight based on the weight of the vinyl polymer. In some other examples, the initiators can be present in the range of about 0.1% to about 5% by weight based on the weight of the vinyl polymer.

Crosslinkers can also be present in the polyurethane vinyl hybrid latex. The crosslinker may be an oil-soluble or a water-soluble compound. In some examples, the crosslinker has two or more ethylenically unsaturated groups. Non-limiting examples of crosslinkers include butadiene, isoprene, allyl-methacrylate, diacrylate and dimethacrylate esters of aliphatic diols such as butanediol diacrylate and hexanediol diacrylate, diethyleneglycol dimethacrylate, divinyl benzene, divinyl ether, divinyl sulfide and trimethylolpropane triacrylate. Any combination of crosslinkers may be used. In some examples, the water-soluble crosslinker is tetraethylene glycol dimethacrylate and the oil-soluble crosslinker is hexanediol diacrylate. The crosslinkers can be present in the range of about 0.01% to about 10% by weight based on the weight of the vinyl polymer. In some other examples, the crosslinkers can be present in the range of about 0.1% to about 5% by weight based on the weight of the vinyl polymer.

The term latex, as used herein, refers to polyurethane vinyl hybrid polymer particles that are dispersed in the liquid vehicle. In some examples, the latex particles have a particles size ranging from about 0.02 to about 3 µm. In some other examples, the average particle size is less than about 1 µm, and in some others examples, is less than about 0.5 µm. In yet some other examples, the latex particles have a size ranging from about 0.03 to about 0.3 µm.

In some examples, the polyurethane vinyl hybrid latexes have a glass transition temperature (Tg) in the range of about −20° C. to 150° C. In some other examples, the polyurethane vinyl hybrid latexes have a glass transition temperature in the range of about 5° C. to 80° C.

In some embodiments, the polyurethane vinyl hybrid latexes have an acid number (AN) which is between 20 and 80. In some other embodiments, the acid number is between 25 and 60, and in yet some other embodiments, the acid number is between 30 and 40. Indeed, it is within these specific AN values that the inks, according to embodiments of the present disclosure, have their best reliability performance.

As used herein, the acid number (also called "neutralization number" or "acid value") represents the mass of potassium hydroxide (KOH), in milligrams, that is needed to neutralize one gram of chemical substance, i.e. polyurethane vinyl hybrid latex. In other words, the acid number reflects the amount of carboxylic acid groups presents in a sample. As used in the procedure, a known amount of sample, dissolved in mixed solvents, is titrated with acid standard solution against a pH sensitive glass electrode. The acid number is expressed in milligrams of KOH required to neutralize one gram of sample. The acid number of the polyurethane vinyl hybrid latex is dependent on the acid number of the initial polyurethane polymer used for the synthesis of the latex. Such acid number depends also on the weight ratio between the polyurethane polymer and the vinyl polymer in the polyurethane vinyl hybrid latex.

In an example, the acid number of the initial polyurethane polymer dispersion is of 60; the weight ratio between the polyurethane polymer and the vinyl polymer, in the polyurethane vinyl hybrid latex, is of 1 per 1; therefore, the acid number of the polyurethane vinyl hybrid latex is 30 (assuming that the vinyl polymer does not have acid functionality). As another example, the acid number of the initial polyurethane polymer dispersion is of 90; the weight ratio between the polyurethane polymer and the vinyl polymer, in the polyurethane vinyl hybrid, is of 1 per 2; therefore, the acid number of the polyurethane vinyl hybrid latex is 30 (assuming that the vinyl polymer does not have acid functionality).

In some examples, the weight ratio of the polyurethane polymer to the vinyl polymer is between about 10 per 1 and about 1 per 10. In some other examples, the weight ratio of the polyurethane polymer to the vinyl polymer is about 1 per 1.

In some embodiments, polyurethane vinyl hybrid latexes are present in an amount ranging from about 0.01% to about 20% by weight of the ink composition. In some other embodiments, the polyurethane vinyl hybrid latexes represent from about 0.1% to about 10% by weight and, in yet some other embodiments, represent from about 0.1% to about 5% by weight of the ink composition.

Polyurethane vinyl hybrid latexes can be available from different commercial sources, such as, for example, the Hybridur® series from Air Products and/or the NeoPac® series from DSM Inc.

As "polyurethane vinyl hybrid latex", it means herein an intimate blend of polyurethane polymers and of vinyl polymers. As used herein, polyurethane polymers refer to segmented polymers joined by urethane links and/or by urea links. Polyurethane polymers are formed through step-growth polymerization, mainly by reacting a monomer containing at least two isocyanate functional groups with another monomer containing at least two alcohol groups in the presence or absence of a catalyst. The term polyurethane dispersion (PUD) or polyurethane polymer dispersion, as used herein, refers to an aqueous dispersion of polyurethane polymers. These polymers can also incorporate hydrophilic functionality to the extent required to maintain a stable dispersion of the polymer in water.

In some embodiments, the polyurethane polymers have an average molecular weight ranging from about 1,000 to about 300,000; in some other embodiments, ranging from about 5,000 to about 200,000, and in yet some other embodiments, ranging from about 20,000 to about 120,000.

In some examples, the acid number of the polyurethane polymers is in the range of about 10 to about 200; in some other examples, in the range of about 20 to about 100, and, in yet some other examples in the range of about 30 to about 70. The acid number is expressed in milligrams of KOH required to neutralize one gram of the polymer.

In some examples, the polyurethane has a glass transition temperature (Tg) ranging from approximately −20° C. to approximately 150° C.; in some other examples, the Tg is ranging from approximately 5° C. to approximately 90° C. as measured by dynamic scanning calorimetry (DSC) and with a heating rate of 20° C./minute.

In some examples, polyurethane vinyl hybrid latexes include vinyl polymers and polyurethane polymer dispersions; such polyurethane polymer dispersions being obtained by reacting organic poly-isocyanates with polymeric polyols in the presence of isocyanate-reactive compounds. Polyurethane polymer dispersions can be prepared by multistage preparation process by reacting organic poly-isocyanates with polymeric polyols in the presence of isocyanate-reactive compounds capable of providing hydrophilic functional groups, for example cationic, anionic or poly-oxyethylene groups, to a polyurethane polymer for water dispersibility. The reaction can be performed under substantially anhydrous conditions at a temperature between about 40° C. and 100° C. In some examples, the reaction is done in the presence of organic solvent until the reaction between the isocyanate group and the hydroxyl group is substantially complete. The polyurethane polymer is then dispersed in water, either neat or dissolved in solvent. In some examples, the dispersion might then react with a chain extender, such as a diamine, triamine, or the like, to form a stable, aqueous polyurethane dispersion. If solvent is used, it is then removed in vacuum, leaving an aqueous dispersion. A charged or nonionic hydrophilic groups can be present, in the polyurethane polymer dispersion, in order to achieve long-term stability to the dispersion, which otherwise might coagulate or settle.

The polymeric polyol can be any of the chemical types of polymeric polyols such as polyethers, polyesters, polyesteramides, polycarbonates, poly-thioethers, poly-acetals, poly-olefins, polyacrylates or polysiloxanes. The polymeric polyols can have two or more hydroxyl groups. In some examples, the polyether polyol is a difunctional polyether polyol such as polyethylene glycol (PEG), polypropylene glycol (PPG) or polytetramethylene glycol (PTMG). In some other examples, the polymeric polyol is polypropylene glycol (PPG). Such polyethers are commercially available from different sources, as for example, under the trade names Lupranol® (BASF), Desmophen® (Bayer), PolyTHF® (BASF), and Terathane® (DuPont). The polyester polyol can also be poly(butylene adipate) and polyethylene terephthalate polyol. Such polyesters are commercially available from different sources under the trade names Desmophen U® (Bayer), Formrez® (Chemtura) or Diexter (COIM Group). Polyesters obtained by the polymerization of lactones, for example caprolactone, in conjunction with the polyol may also be used. Such polyesters are commercially available from different sources such as, for example, under the trade names Capa® (Perstorp). The polycarbonate polyols can also be poly(trimethylene carbonate), poly(tetramethylene carbonate) or poly(hexamethylene carbonate). Such polycarbonates are commercially available from different sources, for example, under the trade names PolyTHF CD® (BASF), Desmophen C200® (Bayer) or Oxymer® (Perstorp). Combination of polyols can also be used in the polyurethane. In some examples, the polymeric polyols have an average molecular weights ranging from about 200 to about 4000, and in some other examples, ranging from about 500 to about 3000 and in some yet other examples ranging from about 750 to about 2000. In some embodiments, the polyurethane binders include polypropylene glycol (PPG) as a polyol or include polypropylene glycol and siloxane containing diol or include polypropylene glycol and per-fluorinated ether diol.

The poly-isocyanate compound can be either aliphatic, cycloaliphatic or aromatic and can contain two or more isocyanate groups. Non-limiting examples of aliphatic isocyanate include hexamethylene diisocyanate-1,6 (HDI), tetramethylxylene diisocyanate (TMXDI), trimethyl-hexamethylene 1,6-diisocyanate (TMDI) and 2-methylpentamethylene 1,5-diisocyanate (MPDI). In some examples, the cycloaliphatic isocyanate can be isophorone diisocyanate (IPDI), 4,4-dicyclohexylmethane-diisocyanate (H12-MDI), cyclohexane diisocyanate (CHDI) and 1,3-bis (isocyanatomethyl)cyclohexane (H6XDI). The aromatic isocyanate can also be toluene diisocyanate (TDI) and methylene diphenyl-isocyanate (MDI). In some other examples, the isocyanate can contain more than two isocyanate groups such as HDI trimer and IPDI trimer. Combination of isocyanates can also be used in the polyurethane. In some examples, isocyanate terminated prepolymers can be used as the poly-isocyanate compound by itself or in combination with other poly-isocyanate compounds. The isocyanate terminated prepolymer can be IPDI-PPG prepolymer Airthane® API-470 commercially available from Air Products.

In some examples, the poly-isocyanate compound is isophorone diisocyanate (IPDI). In some other examples, the polyurethane vinyl hybrid latexes contain polyurethane polymers that include polypropylene glycol (PPG) and isophorone diisocyanate (IPDI).

The isocyanate-reactive compounds, which provide charged groups for water dispersibility, can be dihydroxy-terminated carboxylic, sulfonic and phosphoric acids, such as 2,2-dimethylolpropionic acid (DMPA), 2,2-dimethylolbutanoic acid and N,N-bis(2-hydroxyethyl)-2-aminoethane-sulfonic acid. Non-limiting examples of isocyanate-reactive compounds, which provide non-ionic hydrophilic groups for water dispersibility, include hydrophilic polyetherdiols such as Tegomer®D-3403 available from Evonic and YmerN120® from Perstorp Polyols Inc. In some examples, the isocyanate-reactive compounds are 2,2-dimethylolpropionic acid (DMPA).

In some examples, the ratio of number of isocyanate groups and number of isocyanate-reactive groups is in the range of about 4 per 1 to about 1 per 1.

In some embodiments, the polyurethane vinyl hybrid latexes contain polyurethane polymers that include polypropylene glycol (PPG), isophorone diisocyanate (IPDI) and dimethylolpropionic acid (DMPA). In some other embodiments, the polyurethane vinyl hybrid latexes contain polyurethane polymers that include polypropylene glycol (PPG), isophorone diisocyanate (IPDI), dimethylolpropionic acid (DMPA) and siloxane containing diol or per-fluorinated ether diol.

A catalyst can be used to assist polyurethane polymer dispersion formation. Such catalyst can be added in an amounts ranging from about 0.01% to about 1% by weight, based on weight of all polyurethane polymer components. Non-limiting examples of catalyst include amine-containing compound, for example, dibutyltin dilaurate (DBTL), stannous octoate, triethylamine, 1,4-diazabicyclo[2.2.2]octane (DABCO), and 1,5-diazabicyclo[5.4.0]-7-undecene (DBU).

Prior to dispersing the prepolymer polyurethane mixture in water, the carboxylic functionality can be neutralized to render the prepolymer water dispersible. Non-limiting examples of neutralizing agent include alkali metal hydroxides, ammonia or tertiary amines. The neutralizing agent can be added at about 65 to about 100% of degree of neutralization of carboxyl functionality. The neutralized prepolymer polyurethane may be dispersed in water using two different techniques such as the mixture is added to the water with vigorous agitation, or, alternatively, water may be stirred into the mixture.

Organic solvents can be used to decrease viscosity of polyurethane prepolymer solution. Non-limiting examples of solvents include N-methyl-pyrrolidone, toluene, acetone, methyl ethyl ketone and the like. After neutralization, polyurethane molecular weight can be increased by using an isocyanate-reactive chain extender. The chain extender can be a polyol, an amino-alcohol, ammonia, a primary or secondary aliphatic, alicyclic, aromatic, arylaliphatic, or heterocyclic amine, especially a diamine, hydrazine or a substituted hydrazine. Examples of suitable amino terminated chain extenders may include ethylene diamine, diethylene triamine, triethylene tetramine, propylene diamine, butylene diamine, hexamethylene diamine, cyclohexylene diamine, piperazine, phenylene diamine tolylene diamine, tris(2-aminoethyl)amine, isophorone diamine, etc.

The polyurethane vinyl hybrid latex refers herein to an intimate blend of polyurethane polymers and of vinyl polymers. Vinyl polymers are obtained by polymerization of vinyl polymers. As used herein, vinyl polymer is an ethylenically unsaturated monomer. Non-limiting examples of vinyl polymers include ethylenically unsaturated hydrocarbons, esters and ethers, especially esters of acrylic and methacrylic acids, amides of acrylic and methacrylic acids, ester of vinyl alcohol, styrenes and vinyl-containing cyclic compounds. Alkyl esters of acrylic and methacrylic acid can be methyl acrylate, methyl methacrylate, ethyl acrylate, ethyl methacrylate, propyl acrylate, butyl acrylate, pentyl acrylate, hexyl acrylate, and 2-ethyl hexyl acrylate. Ethylenically unsaturated hydrocarbons include butadiene, isoprene, styrene or substituted styrene. In some examples, vinyl esters and amides are vinyl acetate and vinyl butyrate, acrylonitrile, vinylmethyl, propyl and butyl ethers, vinyl chloride, vinylidene chloride, N-vinyl formamide or N-vinyl acetamide. In some other examples, amides of acrylic and methacrylic acid are acrylamide, N,N-dimethylacrylamide, N-methylol acrylamide or dimethylaminoethyl acrylate. Vinyl-containing cyclic compounds can be vinyl pyrrolidone, vinyl imidazolidone or vinyl pyridine. A combination of ethylenically unsaturated monomers can also be used.

In some examples, the polyurethane vinyl hybrid latex according to the present disclosure is synthesized using emulsion thermal polymerization. Vinyl polymers or a blend of monomers, crosslinkers and initiators can be emulsified in the presence of a polyurethane polymer dispersion. The polymerization is conducted at a temperature ranging from about 30° C. to about 95° C. In some other examples, the polymerization is conducted at a temperature ranging from about 60° C. to about 85° C. Within such exemplified method, the vinyl polymers are in-situ polymerized and cross-linked, with the polyurethane polymer, to form interpenetrated network of the two polymers, i.e. polyurethane/vinyl hybrid polymers. The polymerization can be carried out at a pH of about 7 to about 12. In other examples, the polymerization is conducted at a pH of from about 8 to about 10.

The ink composition contains one or more colorants that impart the desired color to the printed message. As used herein, "colorant" includes dyes, pigments, and/or other particulates that may be suspended or dissolved in an ink vehicle. The colorant system is present in an amount of from about 0.1 to about 10 percent by weight (wt %), in some examples, in an amount of from about 1 to about 6 percent by weight, and in other examples, in an amount of from about 1 to about 4 percent by weight of the ink composition.

In some examples, the ink contains pigments as colorants. As used herein, "pigment" refers to a colorant particle that is substantially insoluble in the liquid vehicle in which it is used. Pigments can be dispersed using a separate dispersing agent, or can be self-dispersed, having a dispersing agent attached to the surface of the pigment. As used herein, "self-dispersed" refers to pigments that have been functionalized with a dispersing agent, such as by chemical attachment of the dispersing agent to the surface of the pigment. The pigments that can be used include both self-dispersed pigments as well as dispersed pigments, e.g., pigments dispersed by a separate dispersing agent that is not covalently attached to the surface. If self-dispersed, a dispersant is prepared in a precursor form, and then the precursor is attached to the pigment to chemically modify the surface of the pigment. In some examples, the dispersant can be attached to the pigment using various precursor materials, such as para-aminobenzoic acids, isophthalic acids, tricarboxylic acids, carboxylic groups, sulfonylic groups, phosphates, oligomers, polymers, and isomers thereof, for example.

As alluded to, pigment colorant can be used in accordance with examples of the present disclosure. Specifically, if black is used, the black pigment can be any commercially available black pigment that provides acceptable optical density and print characteristics. Such black pigments are commercially available from such vendors as Cabot Corporation, Columbian Chemicals Company, Evonik, Mitsubishi, and E.I. DuPont de Nemours and Company. For example, commercially available carbon black pigments include Color Black FW 200, Color Black FW 2V, Color Black FW1, Color Black FW 18, Color Black FW S160, Color Black FW S170, Printex including 95, 85, 75, 55, 45, 300, 35, 25, 200, 12, and Special Blacks including, 4A, 4, 5, 6, 550, 350, 250; BP1100, BP900, BP800, M1100, M900, M800, Monarch 1400, Monarch 1300, Monarch 1000, Monarch 900, Monarch 880, and Monarch 700; Cab-O-Jet 200 and Cab-O-Jet 300; Raven 2500ultra, Raven 2000, Raven 7000, Raven 5750, Raven 5250, Raven 5000, and Raven 3500; 45 B, and combinations thereof.

In addition to black, other pigment colorants can be used, such as cyan, magenta, yellow, blue, orange, green, pink, etc. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, anthanthrone pigments such as PR168, and the like. Representative examples of phthalocyanine blues and greens include copper phthalocyanine blue, copper phthalocyanine green and derivatives thereof (Pigment Blue 15 and Pigment Green 36). Representative examples of quinacridones include Pigment Orange 48, Pigment Orange 49, Pigment Red 122, Pigment Red 192, Pigment Red 202, Pigment Red 206, Pigment Red 209, Pigment Violet 19 and Pigment Violet 42. Representative examples of anthraquinones include Pigment Red 43, Pigment Red 194, Pigment Red 177, Pigment Red 216 and Pigment Red 226. Representative examples of perylenes include Pigment Red 190, Pigment Red 189 and Pigment Red 224. Representative examples of thioindigoids include Pigment Red 86, Pigment Red 87, Pigment Red 198, Pigment Violet 36, and Pigment Violet 38. Representative examples of heterocyclic yellows include Pigment Yellow 1, Pigment Yellow 13, Pigment Yellow 14, Pigment Yellow 17, Pigment Yellow 73, Pigment Yellow 90, Pigment Yellow 110, Pigment Yellow 117, Pigment Yellow 138, Pigment Yellow 150, Pigment Yellow 151, Pigment Yellow 155, and Pigment Yellow 213. Such pigments are commercially available in powder, press cake, or dispersion form from a number of sources.

The pigments can be from about 5 nm to about 10 μm; in another example, the pigments can be from 10 nm to about 500 nm in size, although sizes outside this range can be used if the pigment can remain dispersed and provide adequate printing properties. In some embodiments, the colorant is a dispersed pigment having a particle size of from about 5 nm to about 10 μm.

In some examples, the inks can contain dyes as colorants. Examples of dyes suitable for use in the preparation of the ink composition include, but are not limited to, the yellow dyes such as C.I. Yellow 19 (C.I. 13900A), C.I. Yellow 21 (C.I. 18690), C.I. Yellow 61, C.I. Yellow 80, FD&C Yellow #5, and the like, the orange dyes such as C.I. Orange 1 (C.I. 11920), C.I. Orange 37, and the like, red dyes such as C.I. Solvent Red 8, C.I. Red 81, C.I. Solvent Red 82, and the like, pink dyes such as Diaresin Pink M (Mitsubishi Chemical Industries, Ltd.), and the like, violet dyes such as C.I. Solvent Violet 8, and the like, blue dyes such as C.I. Solvent Blue 2, C.I. Solvent Blue 11, and the like, black dyes such as C.I. Solvent Black 3, Acid Black 123, and the like. Some of the pigments and dyes are commercially available in convenient dispersions and may be used in the preparation of the ink composition according to examples of the present disclosure. In some examples, the ink contains a mixture of dyes and pigments as colorants.

As used herein, "liquid vehicle" is defined to include any liquid composition that is used to carry colorants, including pigments, to a substrate. Such liquid vehicles may include a mixture of a variety of different agents, including without limitation, surfactants, solvents and co-solvents, buffers, biocides, viscosity modifiers, sequestering agents, stabilizing agents, and water. Though not liquid per se, the liquid vehicle can also carry other solids, such as polymers, UV curable materials, plasticizers, salts, etc. In some examples, the composition includes liquid vehicle that contains an organic solvent, surfactants and water. In some other examples, liquid vehicles are inkjet liquid vehicles. In some embodiments, the liquid vehicle contains water, from about 0.1 to about 50 weight percent of an organic solvent and from about 0.01 to about 5 weight percent of surfactants by total weight of the ink composition.

In some examples, organic solvent is part of the liquid vehicles. Organic solvents are often used to increase the solubility or the dispersibility of the resin or of the colorant that might be present in the composition. More particularly, the solvents can be added to reduce the rate of evaporation of water in the inkjet to minimize clogging and improve print quality. Any suitable organic solvent can be used. Examples of suitable classes of organic solvents include polar solvents such as alcohols, amides, esters, ketones, lactones and ethers. Examples of suitable organic solvents include substituted pyrrolidones, water-soluble organic sulfur-containing compounds, glycols, (poly)glycols, glycol ethers and (poly)glycol ethers. The solvent can be a single solvent or a combination of two or more solvents. In some examples, the solvent is a mixture of 1,3-bis(2-hydroxyethyl)-5,5-dimethylhydantoin and 1,2-hexanediol. Examples of substituted pyrrolidones include 2-pyrrolidone, N-methylpyrrolidone (NMP) and 2-hydroxyethyl-2-pyrrolidone. Examples of water-soluble sulfur-containing organic compounds include dimethyl sulfoxide and sulfolane. Examples of glycols include diethylene glycol, triethyleneglycol, tetraethyleneglycol, dipropyleneglycol, propyleneglycol and tripropyleneglycol. Examples of glycol ethers include the mono- and di-alkyl ethers of alkylene glycols in which the alkyl group contains 1-6 carbon atoms (e.g., methyl, ethyl, propyl, butyl, etc.) and the alkylene glycol has 2-6 carbon atoms. Examples of suitable monoalkyl alkylene glycol ethers include ethylene glycol methyl ether, ethylene glycol ethyl ether, ethylene glycol butyl ether, ethylene glycol hexyl ether, diethylene glycol methyl ether, diethylene glycol ethyl ether, diethylene glycol butyl ether, propylene glycol methyl ether, dipropylene glycol methyl ether, tripropylene glycol methyl ether, triethylene glycol ethyl ether, triethylene glycol methyl ether, and the like. Examples of (poly)glycol include polyethyleneglycol and polypropyleneglycol. Examples of (poly)glycol ethers include mono- and di-alkyl ethers of (poly)glycols in which the alkyl group contains 1-6 carbon atoms (e.g., methyl, ethyl, propyl, butyl, etc.). In some examples, the organic solvent is used in an amount of about 0.1% by weight to about 50% by weight of the ink composition and, in some other examples, in an amount of about 5% weight to about 25% by weight of the ink composition.

In some embodiments, surfactants are part of the liquid vehicles. In some other embodiments, the ink composition includes one or more surfactants. The surfactants may be anionic, nonionic, cationic, amphoteric surfactants or mixture thereof. Examples of suitable nonionic surfactants include, linear or secondary alcohol ethoxylates (such as the Tergitol® series available from Union Carbide and the Brij® series from Uniquema), ethoxylated alkyl phenols (such as the Triton® series from Union Carbide), fluoro surfactants (such as the Zonyls® from DuPont; and the Fluorads® from 3M), fatty acid ethoxylates, fatty amide ethoxylates, ethoxylated and propoxylated block copolymers (such as the Pluronic® and Tetronic® series from BASF, ethoxylated and propoxylated silicone based surfactants (such as the Silwet® series from CK Witco), alkyl polyglycosides (such as the Glucopons® from Cognis) and acetylenic polyethylene oxide surfactants (such as the Surfynol® from Air Products). Examples of anionic surfactants include carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, and alkyl naphthalene sulfonates), phosphated (such as phosphated esters of alkyl and aryl alcohols, including the Strodex® series from Dexter Chemical), phosphonated and amine oxide surfactants and anionic fluorinated surfactants. Examples of amphoteric surfactants include betaines, sultaines, and aminopropionates. Examples of cationic surfactants include quaternary ammonium compounds, cationic amine oxides, ethoxylated fatty amines and imidazoline surfactants. Additional examples of the above surfactants are described in "McCutcheon's Emulsifiers and Detergents: 1995, North American Editor". In some examples, surfactants are used in an amount of about 0.01 to about 5% by total weight of the ink composition; in some other examples, in an amount of about 0.1% to about 4% by weight and in yet other examples, in an amount of about 0.25 wt % to about 4 wt % by total weight of the ink composition.

The ink composition can include water. In some examples, water is used as the ink carrier for the composition and is part of the liquid vehicle. In some other examples, the water makes up the balance of the ink composition, and is present in an amount of about 40% weight to about 80% by weight, and in others examples of about 50% to about 80% by weight of the composition. In order to prevent the clogging of ink jet tip by dissolved salts in the water, deionized water may be used in the preparation of the ink composition. In addition to water, various types of additives may be employed in the ink composition to optimize the properties of the ink composition for specific applications. For example, the ink composition may also include any number of buffering agents and/or biocides. Any number of commonly known buffers may be used to establish a desired pH level in the ink system.

In some examples, various biocides are used to inhibit growth of undesirable microorganisms. Several examples of suitable biocides include, but are in no way limited to, benzoate salts, sorbate salts, commercial products such as Nuosept® (ISP), Ucarcide (Dow), Vancide® (RT Vanderbilt Co.), and Proxel® (Avecia), Kordek® MLX (Rohm and Haas) and other known biocides. Such biocides may be present in amount representing less than about 5 wt % of the ink composition and often from about 0.05 wt % to about 2 wt %. Sequestering agents such as EDTA may be included to substantially eliminate potential deleterious effects of heavy metal impurities (if any).

In some examples, the ink composition is an inkjet ink printing composition. By inkjet composition, it is meant herein that the composition is very well adapted to be used in an inkjet device and in an inkjet printing process. The pH of the ink composition may be varied as desired. In some examples, the pH of the ink ranges from about 4 to about 12, depending upon the type of colorant being used. In some other examples, the pH of the ink is from about 5 to about 10 and, in yet other examples, from about 7.5 to about 9.5. The pH may be adjusted by the addition of organic or inorganic acids or bases, i.e. pH adjusting agent. Such pH adjusting agent includes inorganic acids such as hydrochloric, phosphoric and sulfuric acids. Organic acids include methane sulfonic, acetic and lactic acids. Inorganic bases include alkali metal hydroxides and carbonates. In some examples, pH adjusting agent is ammonium hydroxide. Any suitable amount of pH adjusting agent can be used. In an example, the pH adjusting agent is used in an amount of about 0.1 to about 1 percent by weight, and, in another example, in an amount of about 0.3 to about 0.7 percents by weight of the ink composition.

In some examples, the ink compositions have a viscosity within the range of about 1.0 to about 20 cps, and, in other examples, of about 1.0 to about 10 cps, as measured at 25° C., in order to achieve the desired rheological characteristics. The ink compositions may have surface tension within the range of about 16 to about 60 mN/m (i.e. dynes/cm), and, in other examples, from about 18 to about 40 mN/m, as measured at 25° C.

In some examples, the ink composition can be used in a method of forming printed images on surfaces in a heated environment. The method includes projecting a stream of droplets of the ink composition onto a surface to form the desired printed image. The inkjet ink composition may be established on the substrate via any suitable inkjet printing techniques. Non-limitative examples of such inkjet printing techniques include thermal, acoustic, and piezoelectric inkjet printing. In some embodiments, the inks are utilized in thermal inkjet printers. The images are printed on porous and non-porous surfaces, in some examples on porous surfaces. In some examples, the substrate is paper (non-limitative examples of which include plain copy paper or papers having recycled fibers therein) or photo-paper (non-limitative examples of which include polyethylene or polypropylene extruded on one or both sides of paper), and/or combinations thereof. In some other examples, the substrate has a thickness along substantially the entire length ranging between about 0.025 mm and about 0.5 mm. In yet some other examples, the printed surface can be any plastic coated media (as used in out-door signage) and tracing media (for architectural drawings).

As used herein, "images" refers to marks, signs, symbols, figures, indications, and/or appearances deposited upon a substrate with either visible or an invisible ink composition. Examples of an image can include characters, words, numbers, alpha-numeric symbols, punctuation, text, lines, underlines, highlights, and the like. As used herein, "inkjet image" refers to image that is generated by the use of inkjet device and/or inkjet ink.

In some examples, a fixer fluid may be established on the substrate prior to the establishment of the ink composition. Without being bound to any theory, it is believed that the fixer fluid helps in achieving good print quality by holding colorants on the substrate surface. Suitable fixer fluid ingredients include, but are not limited to acids (non-limitative examples of which include organic acids), salts (non-limitative examples of which include bi- or tri-valent metal salts), cationic polymers (non-limitative examples of which include polymers with quaternary ammonium salts), and/or combinations thereof.

In some other examples, the inks are utilized in an inkjet set including, at least, magenta, cyan, yellow and black inks. Colorless ink compositions that contain non-colored particles and no colorant may also be used. Thus, in some embodiments, the present disclosure refers to an ink set including at least one ink selected from the group consisting of black, cyan, magenta and yellow inks, wherein, at least, one ink contains a liquid vehicle, a colorant system, and polyurethane vinyl hybrid latexes.

An exemplary method for making the ink composition encompass combining from about 0.01 wt % to about 20 wt % of polyurethane vinyl hybrid latexes with from about 0.1 wt % to about 10 wt % of a colorant system and with a liquid vehicle. In some examples, the liquid vehicle is made by mixing several components such as solvents, surfactants, biocide and water. The pH of the vehicle is then adjusted to about 8 and polyurethane vinyl hybrid latexes are added. The resulting mixture is subsequently added to the colorant. Indeed, the resulting ink composition presents good print quality, good durability performances, and good reliability performances, while still having good jettability performance when used in inkjet printing technology.

Ingredients and Abbreviations

API-470® is an IPDI-PPG prepolymer, available from Air Product.

MCR-C61® is a polyol (mono-dicarbinol terminated polydimethylsiloxane) available from Gelest.

PolyFox® PF 6520 is a polyol, (perfluorinated ether diol) available from Omnova.

IPDI is isophorone diisocyanate.

DMPA is dimethylol propionic acid.

Cotin 200® is dibutyltin dilaurate catalyst available from Vertellus Specialties Inc.

SR-20 is Adeka Reasoap polymerizable surfactant available from Asahi Denka Co.

HDDA is hexanediol diacrylate.
TEGDMA is tetraethyleneglycol dimethacrylate.
AIMP is 2,2'-azobis(2-methylbutyronitrile) available as V-59 from Wako Chemical Inc.
ACVA is 4,4'-azobis(4-cyanovaleric acid).
MMA is methyl methacrylate.
PPG is polypropylene glycol.
Sensijet Black®SDP 100 is a pigment available from Sensient Colors Inc.
Tergitol®15-S-7 is a surfactant available from Dow Chemical.
Proxel®GXL is a biocide available from Avecia.
Comparative dispersion 1 is NeoPac®E-125, an acrylic-urethane hybrid polymer dispersion, available from DSM NeoResins.
Comparative dispersion 2 is Hybridur®570, an acrylic-urethane hybrid polymer dispersion, available from Air Products.
Comparative dispersion 3 is Hybridur®870, an acrylic-urethane hybrid polymer dispersion, available from Air Products.

Example 1

Synthesis of Polyurethane Polymer Dispersions (PUD)

TABLE 1 represents the chemical composition of polyurethane polymer dispersions 1, 2 and 3 (PUD 1, 2 and 3). The polyurethane polymer dispersions (PUD 1, 2 and 3) are synthesized using different components such as illustrated in TABLE 1 below. Reaction vessel equipped with a thermocouple, condenser, mechanical stirrer and heating mantle is used for the synthesis of the PUDs.

For PUD 1, DMPA, Cotin 200®, API-470® and 25 g of acetone are heated at 65° C. for 8 hours. IPDI and 5 g of acetone are added to the reaction mixture. The mixture is stirred for 8 hours at 65° C. and is then cooled down to 45° C. followed by addition of 50 mL of methanol. The polyurethane polymer is neutralized by KOH solution. Water is added to disperse the neutralized polymer. The organic solvents are removed under vacuum. Such process results in PUD 1 that has a solid content of 18.1 wt % and an average molecular weight of about 56,000.

For PUD 2, Cotin 200®, API-470®, MCR-C61® and 35 g of acetone are heated at 65° C. for 8 hours. DMPA is added to the reaction mixture and is stirred for 19 hours at 65° C. IPDI and 5 g of acetone are added to the reaction mixture. The mixture is stirred for 15 hours at 65° C. and then is cooled down to 45° C., followed by addition of 50 mL of methanol. The polyurethane polymer is neutralized by KOH solution. Water is added to disperse the neutralized polymer. The organic solvents are removed under vacuum. Such process results in PUD 2 that has a solid content of 25.6 wt % and an average molecular weight of about 110,000.

For PUD 3, Cotin 200®, API-470®, PolyFox® PF 6520 and 45 g of acetone are heated at 65° C. for 8 hours. DMPA is added to the reaction mixture and stirred for 19 hours at 65° C. IPDI and 5 g of acetone are added to the reaction mixture. The mixture is stirred for 21 hours at 65° C. and then cooled down to 45° C., followed by addition of 50 mL of methanol. The polyurethane polymer is neutralized by KOH solution. Water is added to disperse the neutralized polymer. The organic solvents are removed under vacuum. Such process results in PUD 3 that has a solid content of 23.7 wt % and an average molecular weight of about 32,000.

TABLE 1

| Ingredients (in g) | PUD 1 | PUD 2 | PUD 3 |
| --- | --- | --- | --- |
| API-470 ® | 78.2 | 61.9 | 65.2 |
| MCR-C61 ® | — | 10.0 | — |
| PolyFox ® PF 6520 | — | — | 10.0 |
| IPDI | 11.4 | 16.6 | 14.2 |
| DMPA | 15.0 | 15.0 | 15.0 |
| Cotin 200 ® | 0.04 | 0.04 | 0.04 |
| Water | 300 | 300 | 300 |
| KOH (45 wt % solution) | 13.9 | 13.9 | 13.9 |

Example 2

Synthesis of Polyurethane Vinyl Hybrid Latexes

The polyurethane vinyl hybrid latexes (hybrid 1, 2 and 3) are synthesized using different components such as illustrated in TABLE 2 below. All polyurethane vinyl hybrid latexes from TABLE 2 have a weight ratio of polyurethane polymer to vinyl polymer of 1 per 1. Reaction vessel equipped with a thermocouple, condenser, mechanical stirrer and heating mantle is charged with different amounts of PUD as obtained in example 1, water and SR-20 surfactant. After 30 min agitation, different amounts of MMA, HDDA, TEGDMA and AIMP (such as exemplified in TABLE 2) are added to the reaction mixture. Such mixture is stirred for 2 hours at room temperature. Then, the reaction mixture is gradually heated to 65° C. within 1 hour. After additional agitation for 1 hour, a neutralized solution with KOH and ACVA is added. The mixture is heated to 80° C. and agitated for 12 hours. After cooling to room temperature, the obtained hybrid latex dispersion is filtered through a course filter. Such process results in: "Hybrid 1" that has a solid content of about 23 wt % and an average particles size of about 53 nm; "Hybrid 2" that has a solid content of about 21 wt % and an average particles size of about 29 nm. "Hybrid 3" that has a solid content of about 20 wt % and an average particles size of about 32 nm.

TABLE 2

| Ingredients (in g.) | Hybrid 1 | Hybrid 2 | Hybrid 3 |
| --- | --- | --- | --- |
| PUD 1 | 145.9 | — | — |
| PUD 2 | — | 103.1 | — |
| PUD 3 | — | — | 111.4 |
| Water | 74.1 | 116.9 | 108.6 |
| MMA | 26.4 | 26.4 | 26.4 |
| SR-20 | 0.37 | 0.37 | 0.37 |
| HDDA | 0.26 | 0.26 | 0.26 |
| TEGDMA | 0.26 | 0.26 | 0.26 |
| AIMP | 0.53 | 0.53 | 0.53 |
| ACVA | 0.53 | 0.53 | 0.53 |

TABLE 3 represents the acid number (AN) of the polyurethane polymer dispersions (PUD 1, 2 and 3) of TABLE 1 of example 1, of the polyurethane vinyl hybrid latexes 1, 2 and 3 of TABLE 2 and of the comparative dispersions 1, 2 and 3 used in the ink compositions of TABLE 4. Acid number of polyurethane polymer dispersions (PUD) of example 1 is calculated based on the amount of DMPA in the polymers. Acid number of polyurethane vinyl hybrid latexes 1, 2 and 3 of TABLE 2 and of the comparative dispersions 1, 2 and 3 are measured.

TABLE 3

| Ingredients | Acid number (AN) |
|---|---|
| PUD 1 | 60 |
| PUD 2 | 60 |
| PUD 3 | 60 |
| Hybrid 1 | 38 |
| Hybrid 2 | 38 |
| Hybrid 3 | 40 |
| Comparative dispersion 1 | 10 |
| Comparative dispersion 2 | 15 |
| Comparative dispersion 3 | 17 |

Example 3

Ink Compositions

Several ink formulations (inks 1-9) are prepared using the components and ranges shown in TABLE 4. Formulations are expressed in weight percentage (wt %) of each component of the ink composition. Ink compositions 4, 5 and 6 contain polyurethane/vinyl hybrid latexes of example 2, TABLE 2. Ink compositions 1, 2, 3 and 7, 8, 9 are comparatives examples. The polyurethane/vinyl hybrid latexes present in ink compositions 4, 5 and 6 are made based on the corresponding PUD dispersions present in ink compositions 1, 2 and 3.

TABLE 4

| | Comparative examples | | | Examples | | | Comparative examples | | |
|---|---|---|---|---|---|---|---|---|---|
| Ingredients | Ink 1 | Ink 2 | Ink 3 | Ink 4 | Ink 5 | Ink 6 | Ink 7 | Ink 8 | Ink 9 |
| Sensijet Black ®SDP 100 | 3 | 3 | 3 | 3 | 3 | 3 | 3 | 3 | 3 |
| 1,3-bis(2-hydroxyethyl)-5,5-dimethylhydantoin | 8 | 8 | 8 | 8 | 8 | 8 | 8 | 8 | 8 |
| Tergitol ® 15-S-7 | 0.75 | 0.75 | 0.75 | 0.75 | 0.75 | 0.75 | 0.75 | 0.75 | 0.75 |
| 1,2 Hexanediol | 5 | 5 | 5 | 5 | 5 | 5 | 5 | 5 | 5 |
| Sodium Dodecyl Sulfate | 1 | 1 | 1 | 1 | 1 | 1 | 1 | 1 | 1 |
| Proxel ®GXL | 0.15 | 0.15 | 0.15 | 0.15 | 0.15 | 0.15 | 0.15 | 0.15 | 0.15 |
| PUD 1 | 3 | — | — | — | — | — | — | — | — |
| PUD 2 | — | 3 | — | — | — | — | — | — | — |
| PUD 3 | — | — | 3 | — | — | — | — | — | — |
| Hybrid 1 | — | — | — | 3 | — | — | — | — | — |
| Hybrid 2 | — | — | — | — | 3 | — | — | — | — |
| Hybrid 3 | — | — | — | — | — | 3 | — | — | — |
| Comparative 1 | — | — | — | — | — | — | 3 | — | — |
| Comparative 2 | — | — | — | — | — | — | — | 3 | — |
| Comparative 3 | — | — | — | — | — | — | — | — | 3 |
| Water | balance | balance | balance | balance | balance | balance | balance | balance | balance |

Example 4

Performances of Ink Compositions

Ink compositions such as illustrated in TABLE 4 of example 3 are printed on both a standard sheet of office paper (Xerox 4200) and on two coated glossy papers (HP Brochure & Flyer Photo Glossy and UPM Max G). The ink compositions are analyzed for their printing performances. The inks are comparatively tested for image quality, image durability (Highlighter smear resistance, Dry rub resistance and drip tests) and for reliability (drop velocity and nozzle health tests). Such results are shown in TABLE 5 below.

The image quality is evaluated visually. Such rating is based on the smoothness of printing and on the presence of any defects/strikes. The rating is done on an average of 3 different media. For the image quality, the following scale is used: "poor" reflects the presence of multiple strikes and/or partially printed areas; "marginal" reflects the presence of some strikes and "good" reflects no/negligible defects.

The highlighter smear resistance test (HL test) refers to the resistance of a print to blurring when stroked with a highlighter marker (Fabercastel). Such test measures the image durability when the print is exposed to a highlighter smear. The smear generated by the highlighter is measured with an X-Rite spectrophotometer for optical density. The difference between the unsmeared print optical density and the average of smear measurements is recorded. The print is tested with 2-pass highlighter, on plain paper (Xerox 4200) and coated paper (HP Brochure & Flyer Photo Glossy and UPM Max G). The following scale is used: "poor" reflects significant smear and damage of printed lines; "marginal" reflects the presence of some smear and "good" reflects none or slight smear.

The "dry rub" test refers to the ability of a printed image to resist appearance degradation upon rubbing the image with dry finger. Good dry rub resistance, upon rubbing, will tend to not transfer ink from a printed image to surrounding areas where the ink has not been printed, i.e., on another printed color or on the paper or other substrate. The following scale is used: "poor" reflects that colorant is removed, exposing the media beneath; "good" refers that there is none or slight removal of colorant.

The "drip" test refers to a test where printed media is placed on a tilted surface and 500 microliters of water is dropped using a micropipette tip. The grading is visual. It is considered "poor" if there is a significant leakage of colorant and "good" if none/slight leakage of colorant occurs.

The "nozzle health" test is a quantitative parameter showing the percentage of firing "healthy" nozzles from the set of all tested nozzles in a kogation experiment. The kogation phenomenon refer to the buildup of the residue on a surface of the resistor element in inkjet pen which results in damage and clogging of the inkjet orifice plate, and thus in poor printing performances along time. The following scale is used: "poor" reflects that less than 90% of nozzles remain "healthy" after 10 million drops per nozzle (MDPN); "good" more than 90% of nozzles remain "healthy" after 10 million drops per nozzle (MDPN).

The "drop velocity change" test is a quantitative measurement of the drop velocity change from 0 life stage (0 MDPN) to final tested life stage (10 MDPN). The following scale is used: "poor" reflects that there is more than 30% of decrease in drop velocity; "marginal" reflects that there is between 10 and 20% decrease in drop velocity; "good" reflects that there is less than 10% decrease in drop velocity.

TABLE 5

| Ink | Image quality | Durability test | | | | Reliability test | |
|---|---|---|---|---|---|---|---|
| | | 2 pass HL (plain) | 2 pass HL (coated) | Drip (coated) | Dry rub (average) | Drop Velocity change | Nozzle health |
| 1 | Marginal | Marginal | poor | poor | poor | Good | poor |
| 2 | poor | Marginal | poor | poor | poor | Good | Good |
| 3 | poor | Marginal | poor | poor | poor | Good | Good |
| 4 | Good | Good | Marginal | Good | Good | Good | Good |
| 5 | Good | Good | Marginal | Good | Good | Good | Good |
| 6 | Good | Good | Marginal | Good | Good | Good | Good |
| 7 | Does not print | Does not print | Does not print | Does not print | Does not print | Does not jet | Does not jet |
| 8 | Marginal | Good | Good | Good | Good | poor | poor |
| 9 | Good | Good | Good | Good | Good | poor | poor |

According to these results, it is clear that ink compositions containing polyurethane vinyl hybrid latexes according to embodiments of the present disclosure, demonstrate excellent print quality, durability and reliability.

Example 5

Drop Velocity Performances of Ink Compositions

Ink compositions are evaluated for their reliability over time and for their efficacy in sustaining kogation depositions. Reliability performances and kogation performances are determined by measuring drop velocity and/or drop weight retained after significant volume of ink firing. The test is carried out with multiple repeating pens for average result.

Ink compositions 4, 5, 6 and comparative control inks 7, 8 and 9 are loaded into two thermal inkjet pens and gradually fired from 0, 1 and 10 million drops per nozzle. The drop velocity (DV), expressed in m/s, is determined for each of ink compositions 4, 5, 6, 7, 8 and 9, after each firing stage: 0, 1 and 10 million drops/nozzle. The drop velocities at each stage are averaged over the two pens per ink and the results are illustrated in FIG. 1. As shown in FIG. 1, ink compositions 4, 5 and 6 do not show change in drop velocity from 1 to 10 million drops/nozzle. For comparative control ink compositions 8 and 9, significant decrease in the drop velocity is observed over the course of firing even at 1 million drops/nozzle. Furthermore, comparative ink composition 7 does not jet and does not produce measurable DV signal. Therefore, ink compositions 4, 5 and 6 containing the polyurethane vinyl hybrids according to embodiments of the present disclosure show outstanding kogation and reliability performances.

The preceding description has been presented only to illustrate and describe exemplary embodiments of the present disclosure. Although certain example methods and compositions have been described herein, the scope of coverage of this patent is not limited thereto. On the contrary, this patent covers all methods and compositions fairly falling within the scope of the claims either literally or under the doctrine of equivalents.

The invention claimed is:

1. An ink composition, comprising:

a liquid vehicle;

a colorant system; and a polyurethane vinyl hybrid latex;

wherein the polyurethane vinyl hybrid latex includes a polyurethane polymer and a vinyl polymer that is in-situ polymerized and cross-linked with the polyurethane polymer;

and wherein the vinyl polymer is selected from the group consisting of ethylenically unsaturated hydrocarbons, esters of acrylic acid or methacrylic acid, amides of acrylic acid or methacrylic acid, vinyl amides, vinyl esters, vinyl-containing cyclic compounds, and combinations thereof.

2. The ink composition according to claim 1 wherein the polyurethane vinyl hybrid latex has an acid number between 20 and 80.

3. The ink composition according to claim 1 wherein the polyurethane vinyl hybrid latex is present in an amount ranging from about 0.01 weight percent to about 20 weight percent of the ink composition.

4. The ink composition according to claim 1 wherein the polyurethane vinyl hybrid latex is in the form of particles dispersed in the liquid vehicle, having a size ranging from about 0.02 µm to about 3 µm.

5. The ink composition according to claim 1 wherein the polyurethane vinyl hybrid latex further includes polymerizable surfactants, free radical initiators, crosslinkers, or combinations thereof.

6. The ink composition according to claim 1 wherein the polyurethane polymer of the polyurethane vinyl hybrid latex has an average molecular weight ranging from about 1,000 to about 300,000.

7. The ink composition according to claim 1 wherein the polyurethane polymer of the polyurethane vinyl hybrid latex is a polyurethane polymer dispersion, said polyurethane polymer dispersion being obtained by reacting organic polyisocyanates with polymeric polyols in the presence of isocyanate-reactive compounds.

8. The ink composition according to claim 1 wherein the polyurethane polymer of the polyurethane vinyl hybrid latex includes polypropylene glycol (PPG) and isophorone diisocyanate (IPDI).

9. The ink composition according to claim 1 wherein the polyurethane polymer of the polyurethane vinyl hybrid latex includes polypropylene glycol (PPG), isophorone diisocyanate (IPDI) and dimethylolpropionic acid (DMPA).

10. The ink composition according to claim 1 wherein the colorant system is present in an amount ranging from about 0.1 weight percent to about 10 weight percent of the ink composition.

11. The composition according to claim 1 wherein the liquid vehicle comprises:
water;
an organic solvent present in an amount ranging from about 0.1 weight percent to about 50 weight percent by total weight of the ink composition; and
a surfactant present in an amount ranging from about 0.01 weight percent to about 5 weight percent by total weight of the ink composition.

12. The ink composition according to claim 1 wherein:
the ethylenically unsaturated hydrocarbons are selected from the group consisting of butadiene, isoprene, styrene, and substituted styrene;
the esters of acrylic acid or methacrylic acid are selected from the group consisting of methyl acrylate, methyl methacrylate, ethyl acrylate, ethyl methacrylate, propyl acrylate, butyl acrylate, pentyl acrylate, hexyl acrylate, and 2-ethyl hexyl acrylate;
the amides of acrylic acid and methacrylic acid are selected from the group consisting of acrylamide, N,N-dimethylacrylamide, N-methylol acrylamide, and dimethylaminoethyl acrylate;
the vinyl esters and vinyl amides are selected from the group consisting of vinyl acetate, vinyl butyrate, acrylonitrile, vinylmethyl, propyl ether, butyl ether, vinyl chloride, vinylidene chloride, N-vinyl formamide, and N-vinyl acetamide; and
the vinyl-containing cyclic compounds are selected from the group consisting of vinyl pyrrolidone, vinyl imidazolidone, and vinyl pyridine.

13. The ink composition according to claim 1 wherein the polyurethane polymer and vinyl polymer are present in the polyurethane vinyl hybrid latex in a ratio of 1:1.

14. An ink composition, comprising:
a liquid vehicle;
a colorant system; and
a polyurethane vinyl hybrid latex;
wherein the polyurethane vinyl hybrid latex comprises polyurethane polymers that include polypropylene glycol (PPG), isophorone diisocyanate (IPDI), dimethylolpropionic acid (DMPA) and siloxane containing diol or per-fluorinated ether diol.

15. An ink set comprising at least one ink selected from the group consisting of black, cyan, magenta and yellow inks;
wherein the at least one ink comprises a liquid vehicle, a colorant system, and a polyurethane vinyl hybrid latex;
wherein the polyurethane vinyl hybrid latex includes a polyurethane polymer and a vinyl polymer that is in-situ polymerized and cross-linked with the polyurethane polymer;
and wherein the vinyl polymer is selected from the group consisting of ethylenically unsaturated hydrocarbons, esters of acrylic acid or methacrylic acid, amides of acrylic acid or methacrylic acid, vinyl amides, vinyl esters, vinyl-containing cyclic compounds, and combinations thereof.

16. The ink set according to claim 15 wherein:
the ethylenically unsaturated hydrocarbons are selected from the group consisting of butadiene, isoprene, styrene, and substituted styrene;
the esters of acrylic acid or methacrylic acid are selected from the group consisting of methyl acrylate, methyl methacrylate, ethyl acrylate, ethyl methacrylate, propyl acrylate, butyl acrylate, pentyl acrylate, hexyl acrylate, and 2-ethyl hexyl acrylate;
the amides of acrylic acid and methacrylic acid are selected from the group consisting of acrylamide, N,N-dimethylacrylamide, N-methylol acrylamide, and dimethylaminoethyl acrylate;
the vinyl esters and vinyl amides are selected from the group consisting of vinyl acetate, vinyl butyrate, acrylonitrile, vinylmethyl, propyl ether, butyl ether, vinyl chloride, vinylidene chloride, N-vinyl formamide, and N-vinyl acetamide; and
the vinyl-containing cyclic compounds are selected from the group consisting of vinyl pyrrolidone, vinyl imidazolidone, and vinyl pyridine.

17. The ink set according to claim 15 wherein the polyurethane polymer and the vinyl polymer are present in the polyurethane vinyl hybrid latex in a ratio of 1:1.

18. A method of inkjet printing over a prolonged period of time comprising jetting an ink onto a media substrate;
wherein said ink composition comprises a liquid vehicle, a colorant system, and a polyurethane vinyl hybrid latex;
wherein the polyurethane vinyl hybrid latex includes a polyurethane polymer and a vinyl polymer that is in-situ polymerized and cross-linked with the polyurethane polymer;
and wherein the vinyl polymer is selected from the group consisting of ethylenically unsaturated hydrocarbons, esters of acrylic acid or methacrylic acid, amides of acrylic acid or methacrylic acid, vinyl amides, vinyl esters, vinyl-containing cyclic compounds, and combinations thereof.

19. A method of making an ink composition comprising combining from about 0.01 wt % to about 10 wt % of a polyurethane vinyl hybrid latex with from about 0.1 wt % to about 10 wt % of a colorant system and with a liquid vehicle;
wherein the polyurethane vinyl hybrid latex includes a polyurethane polymer and a vinyl polymer that is in-situ polymerized and cross-linked with the polyurethane polymer;
and wherein the vinyl polymer is selected from the group consisting of ethylenically unsaturated hydrocarbons, esters of acrylic acid or methacrylic acid, amides of acrylic acid or methacrylic acid, vinyl amides, vinyl esters, vinyl-containing cyclic compounds, and combinations thereof.

* * * * *